United States Patent [19]

Besecke et al.

[11] Patent Number: 5,338,805

[45] Date of Patent: Aug. 16, 1994

[54] POLYMETHACRYLIMIDES HAVING HIGH HEAT DISTORTION RESISTANCE

[75] Inventors: Siegmund Besecke, Hameln; Andreas Deckers, Ludwigshafen; Harald Lauke, Mannheim, all of Fed. Rep. of Germany

[73] Assignee: BASF Aktiengesellschaft, Ludwigshafen, Fed. Rep. of Germany

[21] Appl. No.: 31,907

[22] Filed: Mar. 16, 1993

[30] Foreign Application Priority Data

Mar. 20, 1992 [DE] Fed. Rep. of Germany ....... 4208994

[51] Int. Cl.$^5$ ................................................ C08F 8/32
[52] U.S. Cl. ............................ 525/330.5; 525/328.2; 525/328.3; 525/328.9; 525/329.5; 525/329.8; 525/374; 525/379; 526/318; 526/318.2; 526/320; 526/321; 526/325
[58] Field of Search ............... 525/379, 374, 330.5; 526/318.2, 321, 318

[56] References Cited

U.S. PATENT DOCUMENTS

| | | | |
|---|---|---|---|
| 4,168,242 | 9/1979 | Soula | 252/51.5 |
| 4,246,374 | 1/1981 | Kopchik et al. | |
| 4,889,948 | 12/1989 | Mathias | 560/181 |
| 4,954,575 | 9/1990 | Sasaki | 525/330.5 |
| 4,999,410 | 3/1991 | Mathias | 526/318.3 |
| 5,227,432 | 7/1993 | Jung | 525/286 |

FOREIGN PATENT DOCUMENTS 083040 7/1983 European Pat. Off. .

*Primary Examiner*—Fred Zitomer
*Attorney, Agent, or Firm*—Keil & Weinkauf

[57] ABSTRACT

Copolymers are obtainable by (1) copolymerization of a monomer mixture of (A) from 1 to 99% by weight of at least one monomer of the general formula I $$CH_2=C(E)CH_2-O-CH_2C(F)=CH_2 \qquad I$$

where E and F are selected from the group consisting of —COOR$^1$, —COR$^1$, —CONR$^2$R$^3$ and —CN, and R$^1$ is H, C$_1$–C$_{18}$-alkyl, unsubstituted or substituted C$_3$–C$_8$-cycloalkyl or C$_3$–C$_8$-cycloalkyl- C$_1$–C$_5$-alkyl, hydroxy-C$_1$–C$_5$-alkyl, amino-C$_1$–C$_5$-alkyl, N-C$_1$–C$_4$-alkylamino-C$_1$–C$_5$-alkyl, N, N-di-C$_1$–C$_4$-alkylamino-C$_1$–C$_5$-alkyl, unsubstituted or substituted C$_6$–C$_{18}$-aryl or C$_6$–C$_{18}$-aryl-C$_1$–C$_4$-alkyl, and R$^2$ and R$^3$ are each H, C$_1$–C$_{18}$-alkyl, unsubstituted or substituted C$_3$–C$_8$-cycloalkyl or C$_3$–C$_8$-cycloalkyl-C$_1$–C$_5$-alkyl, unsubstituted or substituted C$_6$–C$_{18}$-aryl or C$_6$–C$_{18}$-aryl-C$_1$–C$_4$-alkyl;

(B) from 99 to 1% by weight of at least one compound selected from the group consisting of acrylic and methacrylic acid and C$_1$–C$_{20}$-alkyl and C$_5$–C$_{12}$-cycloalkyl esters of acrylic and methacrylic acid and (C) from 0 to 98% by weight of at least one further monomer capable of undergoing free radical polymerization and (2) reaction of these copolymers with a compound of the formula II $$R^4NH_2 \qquad II$$

where R$^4$ is hydrogen, C$_1$–C$_{22}$-alkyl, C$_5$–C$_8$-cycloalkyl, C$_6$–C$_{10}$-aryl or C$_6$–C$_{10}$-aryl-C$_1$–C$_4$-alkyl and these radicals, with the exception of hydrogen and C$_1$–C$_{22}$-alkyl, may be substituted, or a mixture thereof, and said copolymers are used for the production of moldings, films and fibers.

2 Claims, No Drawings

POLYMETHACRYLIMIDES HAVING HIGH HEAT DISTORTION RESISTANCE

The present invention relates to copolymers obtainable by (1) copolymerizing a monomer mixture of
(A) from 1 to 99% by weight of at least one monomer of the general formula I $$CH_2=C(E)CH_2-O-CH_2C(F)=CH_2 \quad \text{I}$$

where E and F are selected from the group consisting of —COOR$^1$, —COR$^1$, —CONR$^2$R$^3$ and —CN, R$^1$ is H, C$_1$–C$_{18}$-alkyl, C$_3$–C$_8$-cycloalkyl, C$_3$–C$_8$-cycloalkyl-C$_1$–C$_5$-alkyl, in which the cycloalkyl rings may be monosubstituted to trisubstituted by C$_1$–C$_4$-alkyl or C$_1$–C$_4$-alkoxy, or hydroxy-C$_1$–C$_5$-alkyl, amino-C$_1$–C$_5$-alkyl, N-C$_1$–C$_4$-alkylamino-C$_1$–C$_5$-alkyl, N,N-di-C$_1$–C$_4$-alkylamino-C$_1$–C$_5$-alkyl, C$_6$–C$_{18}$-aryl, C$_6$–C$_{18}$-aryl-C$_1$–C$_4$-alkyl, in which the aryl groups may carry up to three of the following groups: halogen, C$_1$–C$_{22}$-alkyl, C$_1$–C$_4$-alkoxy, carboxyl, C$_1$–C$_4$-alkoxycarbonyl, aminocarbonyl, C$_1$–C$_4$-alkylaminocarbonyl, di-C$_1$–C$_4$-alkylaminocarbonyl, nitrilo, nitro, amino, C$_1$–C$_4$-alkylamino or di-C$_1$–C$_4$-alkylamino and R$^2$ and R$^3$ are each H, C$_1$–C$_{18}$-alkyl, C$_3$–C$_8$-cycloalkyl, C$_3$–C$_8$-cycloalkyl-C$_1$–C$_5$-alkyl, in which the cycloalkyl rings may be monosubstituted to trisubstituted by C$_1$–C$_4$-alkyl or C$_1$–C$_4$-alkoxy, or C$_6$–C$_{18}$-aryl or C$_6$–C$_{18}$-aryl-C$_1$–C$_4$-alkyl, in which the aryl groups may carry up to three of the following groups: halogen, C$_1$–C$_{22}$-alkyl, C$_1$–C$_4$-alkoxy, carboxyl, C$_1$–C$_4$-alkoxycarbonyl, aminocarbonyl, C$_1$–C$_4$-alkylaminocarbonyl, di-C$_1$–C$_4$-alkylaminocarbonyl, nitrilo, nitro, amino, C$_1$–C$_4$-alkylamino or di-C$_1$–C$_4$-alkylamino, (B) from 99 to 1% by weight of at least one compound selected from the group consisting of acrylic and methacrylic acid and C$_1$–C$_{20}$-alkyl and C$_5$–C$_{12}$-cycloalkyl esters of acrylic and methacrylic acid and (C) from 0 to 98% by weight of at least one further monomer which differs from A) and B) and is capable of undergoing free radical polymerization and (2) reacting these copolymers with a compound of the general formula II $$R^4NH_2 \quad \text{II}$$

where R$^4$ is hydrogen, C$_1$–C$_{22}$-alkyl, C$_5$–C$_8$-cycloalkyl, C$_6$–C$_{10}$-aryl or C$_6$–C$_{10}$-aryl-C$_1$–C$_4$-alkyl and these radicals, with the exception of hydrogen and C$_1$–C$_{22}$-alkyl, may be monosubstituted to trisubstituted by radicals selected from the group consisting of C$_1$–C$_4$-alkyl, C$_1$–C$_4$-alkoxy and halogen, or a mixture thereof.

The present invention furthermore relates to a process for the preparation of these copolymers, to their use for the production of moldings, films or fibers, and to moldings, films or fibers consisting of these polymers.

A known method for improving the heat distortion resistance of thermoplastic molding materials based on polymethyl methacrylate (PMMA), which manifests itself, for example, in an increase in the glass transition temperature, comprises copolymerizing methyl methacrylate (MMA) with, for example, alpha-methylstyrene, maleic anhydride, methacrylamide substituted at the nitrogen atom or oxadimethacrylate compounds.

For example, U.S. Pat. No. 4,889,948 describes copolymers of vinylic monomers, such as methyl methacrylate and oxadimethacrylates of the general formula I'

$$CH_2=C(COOZ)CH_2-O-CH_2C(COOZ)=CH_2 \quad \text{I'}$$

where Z is H, methyl, ethyl, n-butyl, isobutyl, tert-butyl, neopentyl, benzyl, phenethyl, trimethylcyclohexyl and tetrahydrofurfuryl. The fact that the highly crosslinked copolymer prepared by mass polymerization of 3.5% by weight of oxadimethyl methacrylate and 96.5% by weight of methyl methacrylate cannot be melted and is insoluble, i.e. cannot be utilized industrially, is a disadvantage.

A further possibility for increasing the glass transition temperature of thermoplastic molding materials based on PMMA is the polymer-analogous reaction of PMMA with primary amines (imidation) with formation of glutarimide structures such as the following

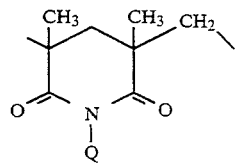

The glass transition temperature of such imidated PMMA molding materials is dependent both on the amount of glutarimide units (degree of imidation) in the polymer and on the substituent Q at the imide nitrogen atom.

In the complete imidation of PMMA, very high glass transition temperatures can be achieved for Q=hydrogen. However, the water absorption exhibits a disadvantageous increase and the flow of such molding materials is excessively reduced. Although these disadvantages can be overcome by other radicals Q, such as methyl or cyclohexyl, this is achieved at the expense of the heat distortion resistance. High glass transition temperatures can be achieved by means of aromatic radicals Q, such as phenyl. However, an excessively low stability to weathering and increased stress corrosion cracking are disadvantages here.

U.S. Pat. No. 4,246,374 describes a process for reacting various copolymers, obtainable by copolymerization of MMA with comonomers, such as styrene, alpha-methylstyrene, (meth)acrylonitrile, maleic anhydride, N-alkylmaleimide, ethylene and propylene, with amines in an extruder (melting process). However, the imidated copolymers thus prepared do not have sufficiently high heat distortion resistances.

It is an object of the present invention to provide transparent molding materials which can be processed by a thermoplastic method and have high heat distortion resistance and good stability to weathering.

We have found that this object is achieved by the copolymers defined at the outset.

We have also found a process for the preparation of these copolymers, their use for the production of moldings, films and fibers, and moldings, films and fibers produced therefrom.

According to the invention, from 1 to 99, preferably from 5 to 50, % by weight of at least one monomer I are used as component A). The monomer to be used preferably has a purity of at least 98%, particularly preferably at least 99%.

The following radicals are preferred substituents of the monomers I which may be referred to as oxadimethacrylates:

$R^1$ is hydrogen;

$C_1$–$C_{18}$-alkyl, including preferably $C_1$–$C_{12}$-alkyl, such as methyl, ethyl, n-propyl, isopropyl, n-butyl, sec-butyl, isobutyl, tert-butyl, n-pentyl, isopentyl, sec-pentyl, tert-pentyl, neopentyl, n-hexyl, n-heptyl, n-octyl, n-nonyl, n-decyl, n-undecyl, n-dodecyl or stearyl, particularly preferably $C_1$–$C_4$-alkyl, such as methyl, ethyl, n-propyl, isopropyl, n-butyl, isobutyl, sec-butyl or tert-butyl;

$C_3$–$C_8$-cycloalkyl, such as cyclopropyl, cyclopentyl, cyclohexyl, cycloheptyl, cyclooctyl, 4-methylcyclohexyl, 4-methoxycyclohexyl or 2,4,6-trimethylcyclohexyl;

$C_3$–$C_8$-cycloalkyl-$C_1$–$C_5$-alkyl, such as cyclopropylmethyl, cyclopentylmethyl, cyclohexylmethyl, cyclopropylethyl, cyclopentylethyl, cyclohexylethyl, cyclopropylpropyl, cyclopentylpropyl, cyclohexylpropyl, cyclopentylbutyl, cyclohexylbutyl, cyclopentylpentyl, cyclohexylpentyl or cyclooctylpentyl;

hydroxy-$C_1$–$C_5$-alkyl, such as hydroxymethyl, 2-hydroxyethyl, 2-hydroxypropyl, 3-hydroxypropyl, 4-hydroxybutyl, 5-hydroxypentyl or 2,2-dimethyl-3-hydroxypropyl; amino-$C_1$–$C_5$-alkyl, such as aminomethyl, 2-aminoethyl, 3-aminopropyl, 4-aminobutyl or 5-aminopentyl;

N-$C_1$–$C_4$-alkylamino-$C_1$–$C_5$-alkyl, such as N-methylaminomethyl, 2-(N-methylamino)ethyl, 3-(N-methylamino)propyl, 4-(N-methylamino)butyl, 5-(N-methylamino)pentyl, N-ethylaminomethyl, N-n-propylaminomethyl or N-n-butylaminomethyl;

N,N-di-$C_1$–$C_4$-alkylamino-$C_1$–$C_5$-alkyl, such as N,N-dimethylaminomethyl, 2-(N,N-dimethylamino)ethyl, 3-(N,N-dimethylamino)propyl, 4-(N,N-dimethylamino)butyl, 5-(N,N-dimethylamino)pentyl, N,N-diethylaminomethyl, N,N-di(n-propyl)aminomethyl, N,N-di(isopropyl)aminomethyl, N,N-di(n-butyl)aminomethyl, N-ethyl-N-methylaminomethyl or N-methyl-N-propylaminomethyl;

$C_6$–$C_{18}$-aryl, such as phenyl, naphthyl, anthracenyl, phenantrenyl, azulenyl, biphenylenyl or triphenylenyl, preferably phenyl, where the alkyl radicals may carry up to three of the groups stated under $R^5$;

$C_6$–$C_{18}$-aryl-$C_1$–$C_4$-alkyl, preferably phenyl-$C_1$–$C_4$-alkyl, such as benzyl, 2-phenylethyl, 3-phenylpropyl or 4-phenylbutyl, particularly preferably benzyl, 2-phenylethyl or 3-phenylpropyl, where the aryl groups may carry up to three of the groups stated under $R^5$;

$R^2$ and $R^3$ are each $C_1$–$C_{18}$-alkyl as stated for $R^1$, including particularly preferably $C_1$–$C_4$-alkyl, such as methyl, ethyl, n-propyl, isopropyl, n-butyl, sec-butyl, isobutyl or tert-butyl;

$C_3$–$C_8$-cycloalkyl, such as cyclopropyl, cyclopentyl, cyclohexyl, cycloheptyl, cyclooctyl, 4-methylcyclohexyl or 2,4,6-trimethylcyclohexyl;

$C_6$–$C_{18}$-aryl as stated for $R^1$, preferably phenyl which may carry up to three of the groups stated under $R^5$;

$C_6$–$C_{18}$aryl-$C_1$–$C_4$-alkyl as stated for $R^1$, preferably phenyl-$C_1$–$C_4$-alkyl, particularly preferably benzyl, 2-phenylethyl or 3-phenylpropyl, where the phenyl group may carry up to three of the groups stated under $R^5$;

$R^5$ is halogen, such as fluorine, chlorine, bromine or iodine, $C_1$–$C_{12}$-alkyl, such as methyl, ethyl, n-propyl, isopropyl, n-butyl, sec-butyl, isobutyl, tert-butyl, n-pentyl, isopentyl, sec-pentyl, tert-pentyl, neopentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl or n-docosyl, preferably $C_1$–$C_{12}$-alkyl, such as methyl, ethyl, n-propyl, isopropyl, n-butyl, sec-butyl, isobutyl, tert-butyl, n-pentyl, isopentyl, sec-pentyl, tert-pentyl, neopentyl, n-hexyl, n-heptyl, n-octyl, n-nonyl, n-decyl, n-undecyl, n-dodecyl or stearyl, particularly preferably $C_1$–$C_4$-alkyl, such as methyl, ethyl, n-propyl, isopropyl, n-butyl, isobutyl, sec-butyl or tert-butyl; $C_1$–$C_4$-alkoxy, such as methoxy, ethoxy, n-propoxy or n-butoxy, carboxyl, $C_1$–$C_4$-alkoxycarbonyl, such as methoxycarbonyl, ethoxycarbonyl, n-propoxycarbonyl or n-butoxycarbonyl, aminocarbonyl, $C_1$–$C_4$-alkylaminocarbonyl, such as methylaminocarbonyl, ethylaminocarbonyl, n-propylaminocarbonyl or n-butylaminocarbonyl, di-$C_1$–$C_4$-alkylaminocarbonyl, such as dimethylaminocarbonyl, diethylaminocarbonyl, di-n-propylaminocarbonyl or di-n-butylaminocarbonyl, nitrilo, nitro, amino, $C_1$–$C_4$-alkylamino, such as methylamino, ethylamino, n-propylamino or n-butylamino, or di-$C_1$–$C_4$-alkylamino, such as dimethylamino, diethylamino, di-n-propylamino or di-n-butylamino.

Particularly preferred oxadimethacrylate compounds I are those in which E and/or F are —$COOR^1$ and $R^1$ is $C_1$–$C_4$-alkyl, $C_5$–$C_8$-cycloalkyl or $C_6$-aryl, such as dimethyl 2,2'-[oxybis(methylene)]bis-2-propenoate, dicyclohexyl 2,2'-[oxybis(methylene)]bis-2-propenoate, cyclohexyl methyl 2,2'-[oxybis(methylene)]bis-2-propenoate and diphenyl 2,2'-[oxybis(methylene)]bis-2-propenoate.

Where E and F are not COOH, oxadimethacrylate compounds I are obtainable both from acrylyl compounds of the general formula III

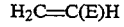   III and from alcohols of the general formula IV

   IV by reaction with formaldehyde. Their preparation is described in, for example, U.S. Pat. No. 4,889,948. However, especially for obtaining particularly pure compounds, it is more advantageous to employ one of the following processes:

A) Reaction of an acrylyl compound of the general formula III

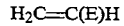   III in the presence of oxygen, at least one tertiary amine and, preferably, at least one polymerization inhibitor with formaldehyde or a formaldehyde donor to give an alcohol of the general formula IV

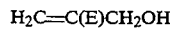   IV and subsequent further reaction of the alcohol IV
 $b_1$) with isolation of said alcohol or
 $b_2$) without isolation of said alcohol while heating in the presence of oxygen, at least one tertiary amine and preferably at least one polymerization inhibitor to give an oxadimethacrylate compound I, $CH_2$=C(E)C$H_2$—O—$CH_2$C(E)=$CH_2$, or B) reaction of the alcohol IV in the presence of oxygen, at least one tertiary amine and, preferably, at least one polymerization inhibitor while heating to give an oxadimethacrylate compound I, $CH_2=C(E)CH_2-O-CH_2C(E)=CH_2$, or C) reaction of a mixture of two different acrylyl compounds of the general formulae III and IIIa

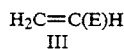 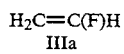

$$H_2C=C(E)H \quad\quad H_2C=C(F)H$$
$$\text{III} \quad\quad\quad\quad \text{IIIa}$$

in the presence of oxygen, at least one tertiary amine and, preferably, at least one polymerization inhibitor with formaldehyde or a formaldehyde donor to give the alcohols of the general formulae IV and IVa

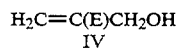 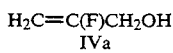

$$H_2C=C(E)CH_2OH \quad\quad H_2C=C(F)CH_2OH$$
$$\text{IV} \quad\quad\quad\quad\quad \text{IVa}$$

and subsequent further reaction, with or without further isolation of the alcohols IV and IVa, with either a) the reaction mixture containing these alcohols or b) the isolated alcohols while heating in the presence of oxygen, at least one tertiary amine and, preferably, at least one polymerization inhibitor to give an oxadimethacrylate compound I, $CH_2=C(E)CH_2-O-CH_2C(F)=CH_2$, or D) reaction of an acrylyl compound II in the presence of oxygen, at least one tertiary amine and at least one polymerization inhibitor with formaldehyde or a formaldehyde donor to give the alcohol IV, and subsequent further reaction of the isolated alcohol IV, or of the reaction mixture containing the non-isolated alcohol IV, with a further alcohol IVa differing from said alcohol, while heating in the presence of oxygen, at least one tertiary amine and, perferably, at least one polymerization inhibitor to give the oxadimethacrylate compound I, $$CH_2=C(E)CH_2-O-CH_2C(F)=CH_2, \text{ or}$$

E) reaction of a mixture of two different alcohols IV and IVa in the presence of oxygen, at least one tertiary amine and at least one polymerization inhibitor while heating to give an oxadimethacrylate compound I $CH_2=C(E)CH_2-O-CH_2C(F)=CH_2$.

The acrylyl compounds III required for these processes are either commercially available or obtained, for example, by esterification, transesterification, amidation or aminolysis by conventional methods (see H. Rauch-Puntigamet al., Chemie, Physik und Technologie der Kunststoffe, Vol. 9, Springer Verlag, Berlin, 1967) from the corresponding readily available acrylyl intermediates, such as acrylic acid and known derivatives thereof.

The corresponding alcohols IV are either known (cf. EP-B 184 731) or are obtainable from the acrylyl compounds III by one of the abovementioned processes.

The formaldehyde can be used in gaseous or liquid form, for example as an aqueous solution, such as formalin, or in the form of an alcoholic solution, or in solid form, for example as paraformaldehyde, trioxane or tetroxocane or as the hemiacetal.

Suitable tertiary a mines are open-chain aliphatic or cyclic tertiary amines, such as trimethylamine, triethylamine, tri-n-propylamine, triisopropylamine, tri-n-butylamine, triisobutylamine, tri-n-pentylamine, methyldiisopropylamine, N,N-diethylisopropylamine, N,N-dimethylethylamine, N,N-dimethylisopropylamine, tri-2-ethylhexylamine, N-methyldiethylamine, N,N-dimethyl-n-propylamine, N,N-dimethyl-n-butylamine, N,N-dimethylisobutylamine, N,N-dimethyl-2-ethylhexylamine, N,N-diisopropyl-2-ethylhexylamine, N,N-di-n-butyl-2-ethylhexylamine, N-methyl-di-2-ethylhexylamine, N-n-butyl-2-ethylhexylamine, N-isobutyl-di-2-ethylhexylamine, quinuclidine and 1,4-diazabicyclo[2.2.2]octane (DABCO ®), perferably quinuclidine and DABCO ®, particularly preferably DABCO ®.

The polymerization inhibitors used are as a rule the conventional ones, such as hydroquinone, hydroquinone monomethyl ether, p-benzoquinone, phenol, 2,6-dimethylphenol, 2,6-di-tert-butylphenol, methylene blue, diphenylamine, Cu(II) oleate, Fe(III) acetylacetonate or pyrocatechol, preferably hydroquinone monomethyl ether or hydroquinone monoethyl ether.

The oxygen may be passed in pure form or in the form of a mixture with unreactive gases, preferably air, over or through the reaction mixture.

In the reaction of the acrylyl compound III or of the mixture III and IIIa to give an oxadimethacrylate compound I via the alcohol compound IV, in the first stage the acrylyl compound III or the mixture III and IIIa and the formaldehyde are used in general in a molar ratio of the acrylyl compound III or mixture III and IIIa to the formaldehyde of from 1:1 to 8:1, preferably from 1.0:1 to 2.5:1.

The tertiary amine is preferably used here in a molar ratio of formaldehyde to amine of from 1:1 to 200:1, preferably from 2:1 to 100:1, particularly preferably from 4:1 to 50:1.

As a rule, the polymerization inhibitor is used in amounts of from 10 to 1,000 mg per kg of acrylyl compound III or mixture III and IIIa.

The amount of oxygen is, as a rule, from 0.01 to 100, preferably from 0.1 to 20, l/h per kg of acrylyl compound III or mixture III and IIIa. If air is used as the oxygen donor, the amount of gas is generally chosen to be from 0.01 to 1,000, preferably from 1 to 250, l/h per kg of acrylyl compound III or mixture III and IIIa.

Temperatures of from 10° to 100° C., preferably from 40° to 80° C., particularly preferably from 60° to 75° C., are generally employed. Furthermore, the reaction is carried out as a rule under atmospheric pressure. However, it can also be effected at reduced or superatmospheric pressure. Use of superatmospheric pressure is advantageous in particular when the reaction is carried out at above 80° C.

Furthermore, the reaction is carried out as a rule in the absence of a solvent. However, the reaction can also be carried out in the presence of a suitable solvent, such as a $C_5-C_8$-alkane, preferably n-pentane, n-hexane, n-heptane, n-octane or isooctane, a carboxylate, such as acetylacetate, or an aromatic solvent, such as benzene, toluene or xylenes, particularly preferably n-hexane, isooctane or toluene, or a mixture thereof.

The reaction time depends in the main on the reaction temperature. It is in general from 1 to 6 hours.

The alcohol IV formed in this reaction, or the mixture IV and IVa can be isolated by the conventional working-up methods, such as distillation or chromatography.

In the second stage, starting from the alcohol IV or from the mixture IV and IVa, the type and amount of the amine, of the polymerization inhibitor and of the solvent are, as a rule, chosen to be similar to those in the first stage. The amount of oxygen is, as a rule, from 0.01 to 1,000, preferably from 0.1 to 50, l/h per kg of alcohol compound IV or mixture IV and IVa. If air is used as an oxygen donor, the amount of gas is generally chosen to be from 0.1 to 1,000, preferably from 1 to 500, l/h per kg of alcohol compound IV or mixture IV and IVa.

The conversion of the second stage (alcohol IV to oxadimethacrylate compound I) is carried out in general at from 100° to 200° C., preferably from 100° to 150° C., and at, as a rule, from 70 to 300 kPa, but preferably under atmospheric pressure.

The water of reaction obtained during the reaction can be removed from the reaction mixture as a rule by distillation, preferably by rectification.

An entraining agent may advantageously be added to the reaction mixture. For example, aliphatic, cycloaliphatic and aromatic hydrocarbons, such as n-hexane, n-heptane, isooctane, benzene, toluene, xylene or cyclohexane, and carboxylates, such as ethyl acetate, or the acrylyl compound II not isolated before the reaction are suitable for this purpose. The boiling point of the entraining agent is generally chosen to be from 80° to 200° C.

The reaction time is dependent on the usual parameters, such as temperature, pressure and the amounts of the starting materials, and is as a rule from 4 to 12 hours.

If the reactions are carried out in a single stage starting from the acrylyl compound III or mixture III and IIIa, i.e. without isolation of the alcohol IV or of the mixture IV and IVa, the acrylyl compound III or the mixture III and IIIa still present in excess is advantageously separated off, for example by distillation, before the further reaction to give the oxadimethacrylate compound I. However, this may also be effected after the reaction to give the oxadimethacrylate compound I.

When one of the processes A), C) and D) is used, the acrylyl compound III or IIIa, which is generally present in excess, is particularly preferably distilled off before beginning the isolation and purification by crystallization. It is also advantageous if the water of reaction formed in the processes A) to E) is separated off, for example by distillation, before the crystallization.

For purification, the oxadimethacrylate compounds I can be precipitated from solutions which contain at least one hydrocarbon compound which is liquid (at room temperature). This hydrocarbon compound may be present in these solutions from the beginning or may only be added later.

As a rule, precipitation is effected directly in the reaction mixtures which in general may contain, in addition to the oxadimethacrylate compound, further substances, such as starting materials, catalysts, stabilizers, etc.

The solubility-reducing hydrocarbon compound can be added at the beginning of the preparation of the solution. In an advantageous procedure, they are generally added to the solution with the oxadimethacrylate compound only when it is desired to initiate the precipitation or crystallization process.

The hydrocarbon compounds used are, as a rule, those whose boiling points are from 20° to 200° C., preferably from 35° to 130° C., such as aliphatic, cycloaliphatic or aromatic hydrocarbons or mixtures thereof. Examples are n-pentane, n-hexane, n-heptane, n-octane, n-nonane, n-decane and their branched isomers, cyclopentane, cyclohexane, cycloheptane, cyclooctane and $C_1$–$C_4$-alkyl-substituted cycloaliphatics, such as methylcyclopentane and methylcyclohexane, or aromatic hydrocarbons, such as benzene, toluene and o-, m- and p-xylene.

The hydrocarbon compound is used, as a rule, in a weight ratio of hydrocarbon compound to oxadimethacrylate compound I of from 1:1 to 100:1, preferably from 1:1 to 10:1, particularly preferably from 2:1 to 4:1.

The temperature at the beginning of the crystallization is preferably chosen so that it is advantageously from 5° to 15° C. below the boiling point of the hydrocarbon compound, in order to obtain a very high concentration of oxadimethacrylate compound I in the hydrocarbon compound. Of course, other temperatures may also be employed, for example room temperature. However, the reaction is generally carried out within the range from 20° to 200° C., preferably from 40° to 130° C., and it may be necessary to use pressures greater than atmospheric pressure. As a rule, from 70 to 250 kPa, preferably atmospheric pressure, is chosen.

If the hydrocarbon compound is not added until it is required to initiate the crystallization, or if the hydrocarbon compound is immiscible or only partly miscible with the corresponding solvent, it may be advantageous to mix the mixture thoroughly prior to crystallization by conventional methods, such as shaking or stirring or by means of liquid-liquid extraction. This step can be carried out in one or more stages, continuously or batchwise. The temperature in this step is advantageously chosen in the abovementioned range of from 20° to 200° C., preferably from 40° to 130° C.

In general, solutions which contain the oxadimethacrylate compounds in amounts of from 5 to 50, preferably from 10 to 30, % by weight are used for the recrystallization. The hydrocarbon compounds stated further above are generally used as solvents.

The subsequent crystallization of the oxadimethacrylate compound I is carried out, as a rule, at from $-80°$ to 30° C., preferably from $-30°$ to 20° C. The crystallized product is then separated off in a conventional manner, for example by filtration or centrifuging, and is dried in a manner known per se.

Where two or more liquid phases are present, the phase not enriched with the hydrocarbon compound can be separated off after the crystallization process and fed to a further working-up cycle, in order also to obtain the remaining amounts of the oxadimethacrylate compound I. This process can be repeated as often as desired and may be carried out continuously or batchwise.

The crystallization process is repeated in general until the desired purity has been achieved.

Oxadimethacrylate compounds I where E and/or F are COOH are preferably prepared by hydrolyzing the oxadimethacrylate I where E and F are each —COOR$^1$, or a mixture of different esters of this type, in basic solution and then acidifying the resulting salt. The precipitated acid can then be separated off and, if required, recrystallized in an acidic, aqueous medium.

The basic solution chosen is in general an aqueous solution of an alkali metal alcoholate, such as sodium methylate, potassium methylate, sodium ethylate or potassium ethylate, preferably sodium methylate, an alkali metal or alkaline earth metal hydroxide, such as lithium hydroxide, sodium hydroxide, potassium hydroxide, magnesium hydroxide, calcium hydroxide and barium hydroxide, preferably sodium hydroxide or potassium hydroxide, or ammonia.

Additives, such as solubilizers and polymerization inhibitors, can be added to the reaction medium. The solubilizers which may be used are, for example, alcohols, preferably $C_1$–$C_4$-alcohols, such as methanol, ethanol, n-propanol, isopropanol, n-butanol, or tert-butanol, particularly preferably methanol and ethanol. The polymerization inhibitors used are preferably the conventional water-soluble compounds, such as hydroquinone, hydroquinone monoethyl ether and Cu(II) salts.

To liberate the free acid, an acid, preferably a mineral acid, such as sulfuric acid, hydrochloric acid, phosphoric acid or nitric acid, particularly preferably hydrochloric acid, is added to the reaction medium.

The molar ratio of base to ester is chosen in general in the range from 1 to 5, preferably from 2 to 4. The base is used, as a rule, as an aqueous solution having a concentration of from 0.1 to 40, preferably from 1 to 20, % by weight, based on water.

The amount of solubilizer is chosen in general in the range from 0 to 30, preferably from 0 to 10, % by weight, and the amount of polymerization inhibitor is chosen, as a rule, in the range from 0 to 0.1, preferably from 0 to 0.05, % by weight, based in each case on the total amount of the reaction mixture.

The amount of the acid used for precipitation depends on its strength and concentration. As a rule, it is chosen so that the salt-containing medium, generally the reaction mixture, is brought to a pH of from 0.5 to 2.0, preferably from 0.5 to 1.5.

According to observations to date, the choice of the temperature is not critical. As a rule, the reaction is carried out at from 10° to 100° C. under from 70 to 300 kPa. Hydrolysis may also be carried out at above 100° C., but as a rule not higher than 200° C., in a pressure reactor. However, the reaction is preferably carried out at atmospheric pressure at from 15° to 50° C.

The precipitated oxadimethacrylic acid can be isolated by a conventional method, such as filtration, decanting or centrifuging, and, if desired, may be purified, for example by washing it with cold water and then drying it. According to observations to date, the oxadimethacrylic acid thus obtained has a purity of at least 99%.

Particularly pure oxadimethacrylic acid, for example containing less than 100 ppm of byproducts, can preferably be obtained by recrystallization. For this purpose, the oxadimethacrylic acid is generally dissolved in water at from 50° to 100° C., preferably from 60° to 100° C., particularly preferably from 80° to 100° C., and is then allowed to crystallize at from 5° to 30° C., preferably from 10° to 25° C. Polymerization inhibitors, such as hydroquinone monomethyl ether, in amounts of from 10 to 20 ppm may be added to the solution. Furthermore, adsorbing substances, such as active carbon, kieselguhr and zeolites, may be added to the solution, which may then be filtered while hot and thereafter allowed to cool for crystallization.

The carboxyl groups of the oxadimethacrylic acid can be further functionalized by conventional methods to give ester, amide and ketone groups (cf. Houben-Weyl, Methoden der organischen Chemie, Vol. VIII-/III, Thieme, Berlin, 1952, page 503 et seq. and page 647 et seq.).

According to the invention, from 1 to 99, preferably from 50 to 95, % by weight of at least one compound selected from the group consisting of acrylic and methacrylic acid ((meth)acrylic acid) and the $C_1$–$C_{20}$-alkyl and $C_5$–$C_{12}$-cycloalkyl esters of (meth)acrylic acid, preferably the $C_1$–$C_{12}$-alkyl esters, in particular the $C_1$–$C_4$-alkyl esters, such as methyl acrylate, ethyl acrylate, propyl acrylate, n-butyl acrylate, tert-butyl acrylate and 2-ethylhexyl acrylate, lauryl acrylate, methyl methacrylate, ethyl methacrylate, propyl methacrylate, n-butyl methacrylate and tert-butyl methacrylate, in particular methyl methacrylate, are used as component B).

Furthermore, from 0 to 98, preferably from 1 to 50, % by weight of further monomers which differ from A) and B) and are capable of free radical copolymerization may be added to the monomer mixture as component (C).

Examples are: acrylonitrile and methacrylonitrile, acrylamide and methacrylamide and their N-alkyl and N,N-dialkyl derivatives having $C_1$–$C_{20}$-alkyl groups, vinyl and vinylidene esters of aliphatic $C_2$–$C_8$-carboxylic acids, such as vinyl acetate, vinyl and vinylidene halides, such as vinyl chloride and vinylidene chloride, vinylaromatic monomers, such as styrene and alpha-methylstyrene and its derivatives which are monosubstituted or polysubstituted in the nucleus, for example 2-, 3- and 4-methylstyrene, 2-, 3- and 4-ethylstyrene, 2-, 3- and 4-isopropylstyrene, 4-tert-butylstyrene, 3,4-dimethylstyrene, 2- and 4-chlorostyrene, 2- and 4-bromostyrene, 3,4-dichlorostyrene, vinyltoluene and alpha-chlorostyrene, particularly preferably styrene, $C_1$–$C_{10}$-alkyl maleares, fumarates and itaconates, maleamide, fumaramide and itaconamide and their N-alkyl and N,N-dialkyl derivatives having $C_1$–$C_{10}$-alkyl groups and mixtures thereof.

Monofunctional $C_1$–$C_{12}$-alkyl mercaptans, such as methyl mercaptan, sec-butyl mercaptan, n-dodecyl mercaptan, isododecyl mercaptan and tert-dodecyl mercaptan, and thioacetic acid and their $C_1$–$C_4$-alkyl esters may be used as chain transfer agents. They are used, as a rule, in amounts of from 0 to 5, preferably 0.05 to 2, % by weight.

The chain transfer agents may serve to limit the chain length and, according to observations to date, help to improve the thermal stability.

The novel copolymers are prepared in general in a conventional manner, for example by mass or solution polymerization.

In the preparation by mass polymerization, oil-soluble initiators (free radical initiators, such as diacyl peroxides, peresters, such as tert-butyl perpivalate, peroxydicarbonates, hydroperoxides, dialkyl peroxides, such as dilauryl peroxide, or azo compounds, such as azobisisobutyronitrile) may be used. The polymerization temperature is, as a rule, from 20° to 200° C., preferably from 50° to 160° C.

The molecular weight can be regulated by suitable chain transfer agents, such as the abovementioned mercaptans, or by suitable temperature control. In general, the molecular weights are chosen in the range from 50,000 to 180,000, preferably from 80,000 to 130,000, g/mol (weight average molecular weight).

The copolymers may also be prepared by solution polymerization. Examples of suitable solvents are toluene, xylene, acetone and tetrahydrofuran. Otherwise, the polymerization may be carried out under the conditions described for the mass polymerization.

Further details in this context are given, for example, in Houben-Weyl, Methoden der organischen Chemie, Vol. 14/1.

In addition to ammonia, primary amines which are selected from the group consisting of $C_1$–$C_{22}$-alkylamines, $C_5$–$C_8$-cycloalkylamines, $C_6$–$C_{10}$-arylamines and $C_6$–$C_{10}$-aryl-$C_1$–$C_4$-alkylamines, where the cycloalkyl, aryl and aralkyl radicals of the amines may be monosubstituted to trisubstituted by radicals selected from the group consisting of $C_1$–$C_4$-alkyl, $C_1$–$C_4$-alkoxy and halogen, such as fluorine, chlorine and bromine, are used as imidation reagents II, $R^4NH_2$.

Examples are methylamine, ethylamine, n-propylamine, isopropylamine, n-butylamine, 1-methylpropylamine, 2-methylpropylamine, 1,1-dimethylethylamine, n-pentylamine, 1-methylbutylamine, 2-methylbutylamine, 3-methylbutylamine, 2-dimethylpropylamine, 1-ethylpropylamine, n-hexylamine, n-heptylamine, n-octylamine, n-nonylamine, n-decylamine, n-undecylamine, n-dodecylamine, stearylamine, cyclopentylamine, cyclohexylamine, cycloheptylamine, cyclooctylamine, aniline, 2- and 4-methylaniline, 2- and 4-methoxyaniline, 2- and 4-chloroaniline, 2- and 4-bromoaniline, benzylamine, phenethylamine and phenylpropylamine, particularly preferably cyclohexylamine.

In a preferred embodiment, the alcohol formed by the aminolysis of the ester groups is removed from the reaction mixture. This can be particularly advantageously achieved by continuously distilling off the alcohol. For this purpose, it is advantageous to use for the imidation and amine which has a higher boiling point than the alcohol to be removed from the reaction mixture, so that no amine or only an insignificant amount of amine is removed at the same time.

In principle, amines having the same or a lower boiling point than the alcohol to be distilled off may also be used if the amine simultaneously removed is separated from the alcohol, for example by further distillation, and is reintroduced into the reaction mixture. However, the variant proposed here (boiling point of amine>boiling point of alcohol) is preferred owing to the simpler reaction procedure.

The reaction is carried out, as a rule, in such a way that a mixture consisting of copolymer (1) and amine, preferably in a solvent, is heated to the boil in the absence of oxygen, and the alcohol formed during the reaction is removed continuously from the reaction mixture by distillation.

The amine may be introduced right at the beginning of the reaction or, for example, added continuously at the rate at which it is consumed.

The weight ratio of amine used to acrylate polymer is chosen in the range from 1:1 to 400:1, preferably from 1:1 to 200:1.

The solvent used may be in principle any aprotic polar solvent, such as an N,N'-disubstituted, cyclic or acyclic carboxamide, such as dimethylformamide, diethylformamide, dimethylacetamide or diethylacetamide, N-methyl-2-pyrrolidone, N-ethyl-2-pyrrolidone, an N,N,N',N'-tetrasubstituted, cyclic or acyclic urea, such as tetramethylurea, an N-substituted, cyclic or acyclic (poly)amine, such as dicyclohexylmethylamine, dimethylcyclohexylamine, N,N,N',N'-tetramethylethylenediamine or N,N,N',N'-tetramethylhexamethylenediamine, a high-boiling ether, such as ethylene glycol dimethyl ether or diethylene glycol dimethyl ether, an alkylene carbonate, such as ethylene carbonate or propylene carbonate, or another conventional aprotic, polar solvent, such as hexamethylphosphorotriamide, a nitroalkane, such as nitromethane, dimethyl sulfoxide, diphenyl sulfoxide or sulfolane, N-methylpyrrolidone being preferred.

The weight ratio of solvent used to polymer is, as a rule, from 1:1 to 100:1, preferably from 1:1 to 10:1.

The reaction temperature is chosen in general in the range from 100° to 280° C., preferably from 120° to 220° C.

The reaction pressure is generally not critical. The reaction is carried out in general at from 80 to 250 kPa, preferably under atmospheric pressure.

The choice of the pH is likewise not critical and, owing to the amine used, is generally about 7.

The reaction time is, as a rule, from 1 to 20, preferably from 1 to 10, hours.

Furthermore, catalysts in amounts of from 0.01 to 10% by weight, based on the polymer used, may be added to the reaction mixture to accelerate the reaction. Examples are tertiary amines, such as tricyclohexylamine, substituted guanidines, such as 1,1,3,3-tetramethylguanidine and 1,3-diphenylguanidine, tetrasubstituted alkylammonium compounds, such as trimethylstearylammonium chloride, organic titanium compounds, such as tetrapropoxytitanium and tetrabutoxytitanium, organic tin compounds, such as dibutyltin oxide and dibutyltin didodecanoate, aromatic amines and imides, such as quinoline, isoquinoline, 4-benzylpyridine, 4-phenylpyridine, 2-hydroxypyridine, 1,3-, 1,4- and 2,3-benzodiazine and 2,2'-, 2,3'- and 2,4'-bipyridyl, imides, such as N,N'-dicyclohexylcarbodiimide, and antimony trioxide, tin dioxide, sodium amide, sodium alcoholates and potassium alcoholates, such as sodium methylate and potassium methylate, ammonium chloride and ammonium iodide.

The novel copolymers and moldings, films and fibers produced therefrom may contain conventional additives and processing assistants. Their amount is, as a rule, up to 5, preferably up to 2, % by weight, based on the total weight of the copolymers.

Examples of conventional additives are stabilizers and antioxidants, heat stabilizers and UV stabilizers, lubricants and mold release agents, dyes, pigments, plasticizers and antistatic agents.

Antioxidants and heat stabilizers which may be added to the thermoplastic materials according to the invention are, for example, sterically hindered phenols, hydroquinones, phosphites and derivatives and substituted members of this group and mixtures of these compounds, preferably in concentrations of up to 1% by weight, based on the weight of the mixture.

Examples of UV stabilizers are substituted resorcinols, salicylates, benzotriazoles and benzophenones, which may be used in general in amounts of up to 1% by weight.

Examples of lubricants and mold release agents which may be added to the thermoplastic material as a rule in an amount of up to 1% by weight are stearic acid, stearyl alcohol, alkyl stearates and stearamides, as well as esters of pentaerythritol with long-chain fatty acids. Suitable dyes are organic dyes, for example anthraquinone red, organic pigments and lakes, such as phthalocyanine blue, and inorganic pigments, such as titanium dioxide and cadmium sulfide. Examples of plasticizers are dioctyl phthalate, dibenzyl phthalate and butyl benzyl phthalate.

Flameproofing agents may be used as further additives, as a rule in amounts of from 1 to 40% by weight. Such flameproofing agents are, for example, organic phosphorus compounds, such as the esters of phosphoric acid, of phosphorous acid and of phosphonic and phosphinic acid as well as tertiary phosphines and phosphine oxides. An example is triphenylphosphine oxide.

Compounds which contain phosphorus-nitrogen bonds, such as phosphononitrile chloride, phosphoric ester amides, phosphoroamides, phosphinamides, trisaziridinylphosphine oxide or tetrakis-(hydroxymethyl)phosphonium chloride, are also suitable flame-proofing agents.

The additives may be added in any stage of preparation; the stabilizers are advantageously introduced at an early stage in order to provide protection at the beginning. In agreement with this, the stabilizers are generally added as early as during the polymerization process, provided they do not interfere with this.

The novel copolymers may be processed by conventional methods, for example by injection molding, extrusion or sintering, for the production of moldings, films or fibers.

The novel copolymers can be used to produce molding materials which can be processed by a thermoplastic method and have high heat distortion resistance.

EXAMPLES

Example 1

Preparation of dimethyl 2,2'-[oxybis(methylene)]bis-2-propenoate (oxadimethylmethacrylate)

A mixture of 600 g of methyl acrylate, 105 g of paraformaldehyde, 39 g of DABCO ® (1,4-diazabicyclo[2.2.2]-octane) and 120 mg of hydroquinone monomethyl ether was heated for 1.75 hours at 75° C., 10 l/h of air simultaneously being passed through the mixture. Excess methyl acrylate was then distilled off with further heating until the temperature of the reaction mixture at the bottom was 135° C. The water of reaction formed in the reaction was then distilled off in the course of 4 hours at 135° C. Thereafter, the reaction mixture was cooled to 60° C., 975 g of n-hexane were added and stirring was carried out for one hour at 60° C. The lower phase was then separated off and the upper phase was cooled to 0° C. while stirring. Part of the dimethyl ester was precipitated in the form of fine, white crystals. Filtering off, washing with 200 ml of n-hexane at 0° C. and drying at 25° C./10 kPa gave 244 g of the dimethyl ester in a purity of 95%. Further crystallization led to a dimethyl ester having a purity of 99.5%.

Example 2

Preparation of dicyclohexyl 2,2'-[oxybis(methylene)]bis-2-propenoate (oxadicyclohexylmethacrylate)

A mixture of 739 g of cyclohexyl acrylate, 72 g of paraformaldehyde, 26.9 g of DABCO ® and 413 mg of hydroquinone monomethyl ether was heated for 6 hours at 75° C., 10 l/h of air being passed simultaneously through the mixture. Excess cyclohexyl acrylate was then distilled off with further heating until the temperature of the reaction mixture at the bottom was 135° C. The water of reaction formed in the reaction was then distilled off in the course of 18 hours at 135° C., isooctane serving as an azeotropic entraining agent. Thereafter, preparative column chromatography of the distillation residue over silica gel using 20:80 ethyl acetate/hexane as eluant gave 304 g of dicyclohexyl 2,2'-[oxybis(methylene)]bis-2-propenoate (purity:99.6%).

Preparation of the Starting Copolymers (1)

Example 3

A mixture of 60 g of the oxadimethylmethacrylate from Example 1, 140 g of methyl methacrylate, 0.2 g of dilauryl peroxide, 0.4 g of tert-butyl perpivalate and 800 g of tetrahydrofuran was heated at 65° C. for 24 hours in a nitrogen atmosphere. 5 l of methanol were then added to the reaction mixture. The precipitated polymer was filtered off and was dried at 50° C. 190 g of the copolymer were obtained.

Examples 4 to 8

In the Examples below, the procedure was as in Example 3, except that the monomer compositions were varied as stated in Table 1 below.

TABLE 1

| | Preparation of the starting copolymers according to Examples 3 to 8 | | | | |
|---|---|---|---|---|---|
| Example | Oxadimethacrylate compound [g] | Methyl methacrylate [g] | Styrene [g] | Intrinsic viscosity[1] | Yield [g] |
| 3 | 60 ODMMA[2] | 140 | — | 80 | 190 |
| 4 | 60 ODCHMA[3] | 140 | — | 83 | 178 |
| 5 | 100 ODMMA[2] | 100 | — | 61 | 151 |
| 6 | 100 ODCHMA[3] | 100 | — | 65 | 173 |
| 7 | 60 ODMMA[3] | 120 | 20 | 77 | 178 |
| 8 | 60 ODCHMA[3] | 120 | 20 | 71 | 148 |

[1])Measured as a 0.5% strength solution in chloroform at 25° C.
[2])ODMMA = Oxadimethylmethacrylate
[3])ODCHMA = Oxadicyclohexylmethacrylate Imidation of the copolymers

Example 9

A mixture of 10 g of the copolymer from Example 3, 10 g of cyclohexylamine and 80 g of N-methylpyrrolidone was heated to the boil under nitrogen in a reaction vessel having a packed column. After about 1 hour, it was possible to remove methanol from the top of the column, the procedure over the next 6 hours being such that the temperature at the top of the column was not higher than 70° C. Thereafter, the excess amine was distilled off and the imidated copolymer was precipitated in methanol and then dried.

The characterization of the product is shown in Table 2.

Examples 10 to 14

10 g of a copolymer (from Examples 4 to 8) were reacted with 10 g of cyclohexylamine similarly to Example 9, and the product was worked up as stated above.

COMPARATIVE EXAMPLE (similar to U.S. Pat. No. 4,246,374)

10 kg/h of PMMA (from 99% by weight of MMA and 1% by weight of MA and having an average molecular weight ($M_w$) of 115,000 g/mol) were reacted continuously with 5 kg/h of cyclohexylamine at 270° C. in a twin-screw extruder (ZSK-40) having intermeshing screws rotating in the same direction. The reaction time was 0.1 hour. After the reaction zone, the polymer melt was devolatilized in the same extruder and was granulated.

The characterization of the products is shown in Table 2.

The glass transition temperature $T_g$ of the polymers was determined by the DSC method (ASTM D 3418-82) on a DSC-30 apparatus from Mettler.

TABLE 2

| Characterization of the products from Examples 9 to 14 and from the Comparative Example | | | |
|---|---|---|---|
| Example | Polymer (Amount of monomers in % by weight) | N content[1] | $T_g$ [°C.] |
| 9 | MMA[2] (70)/ODMMA[3] (30) | 5.1 | 235 |
| 10 | MMA[2] (70)/ ODCHMA[4] (30) | 5.0 | 212 |
| 11 | MMA[2] (50)/ ODMMA[3] (50) | 4.3 | 221 |
| 12 | MMA[2] (50)/ ODCHMA[4] (50) | 4.5 | 203 |
| 13 | MMA[2] (60)/ ODMMA[3] (30)/ Styrene (10) | 4.8 | 231 |
| 14 | MMA[2] (60)/ ODCHMA[4] (30)/ Styrene (10) | 4.7 | 205 |
| Comp- arsion | MMA[2] (99)/ Methyl acrylate (1) | 3.0 | 165 |

[1] N content from elemental analysis
[2] MMA = Methyl methacrylate
[3] ODMMA = Oxadimethyl methacrylate
[4] ODCHMA = Oxadicyclohexyl methacrylate

We claim:

1. A copolymer which is processable by a thermoplastic method and which is obtained by
   (1) copolymerizing a monomer mixture of
      (A) from 1 to 99% by weight of at least one monomer of the formula I $$CH_2=C(E)CH_2-O-CH_2C(F)=CH_2 \quad\quad I$$

where E and F are selected from the group consisting of —$COOR^1$; —$COR^1$, —$CONR^2R^3$ and —CN, $R^1$ is H, $C_1$–$C_{18}$-alkyl, $C_3$–$C_8$-cycloalkyl, $C_3$–$C_8$-cycloalkyl-$C_1$–$C_5$-alkyl, in which the cycloalkyl rings may be monosubstituted to trisubstituted by $C_1$–$C_4$-alkyl or $C_1$–$C_4$-alkoxy, or hydroxy-$C_1$–$C_5$-alkyl, amino-$C_1$–$C_5$-alkyl, N-$C_1$–$C_4$-alkylamino-$C_1$–$C_5$-alkyl, N,N-di-$C_1$–$C_4$-alkylamino-$C_1$–$C_5$-alkyl, $C_5$–$C_{18}$-aryl, $C_5$–$C_{18}$-aryl-$C_1$–$C_4$-alkyl, in which the aryl groups may carry up to three of the following groups: halogen, $C_1$–$C_{22}$-alkyl, $C_1$–$C_4$-alkoxy, carboxyl, $C_1$–$C_4$-alkoxycarbonyl, aminocarbonyl, $C_1$–$C_4$-alkylaminocarbonyl, di-$C_1$–$C_4$-alkylaminocarbonyl, nitrilo, nitro, amino, $C_1$–$C_4$-alkylamino or di-$C_1$–$C_4$-alkylamino and $R^2$ and $R^3$ are each H, $C_1$–$C_{18}$-alkyl, $C_3$–$C_8$-cycloalkyl, $C_3$–$C_8$-cycloalkyl-$C_1$–$C_5$-alkyl, in which the cycloalkyl rings may be monosubstituted to trisubstituted by $C_1$–$C_4$-alkyl or $C_1$–$C_4$-alkoxy, or $C_5$–$C_{18}$-aryl or $C_8$–$C_{18}$-aryl-$C_1$–$C_4$-alkyl, in which the aryl groups may carry up to three of the following groups: halogen, $C_1$–$C_{22}$-alkyl, $C_1$–$C_4$-alkoxy, carboxyl, $C_1$–$C_4$-alkoxycarbonyl, aminocarbonyl, $C_1$–$C_4$-alkylaminocarbonyl, di-$C_1$–$C_4$-alkylaminocarbonyl, nitrilo, nitro, amino, $C_1$–$C_4$-alkylamino or di-$C_1$–$C_4$-alkylamino, (B) from 99 to 1% by weight of at least one compound selected from the group consisting of acrylic and methacrylic acid and $C_1$–$C_{20}$-alkyl and $C_5$–$C_{12}$-cycloalkyl esters of acrylic and methacrylic acid and (C) from 0 to 98% by weight of at least one further monomer which differs from A) and B) and is capable of undergoing free radical polymerization and (2) reacting these copolymers with a compound of the formula II $$R^4NH_2 \quad\quad II$$

where $R^4$ is hydrogen, $C_1$–$C_{22}$-alkyl, $C_5$–$C_8$-cycloalkyl, $C_5$–$C_{10}$-aryl or $C_5$–$C_{10}$-aryl-$C_1$–$C_4$-alkyl and these radicals, with the exception of hydrogen and $C_1$–$C_{22}$-alkyl, may be monosubstituted to trisubstituted by radicals selected from the group consisting of $C_1$–$C_4$-alkyl, $C_1$–$C_4$-alkoxy, halogen, and a mixture thereof.

2. A copolymer as defined in claim 1, wherein monomer A is oxadimethyl methacrylate and monomer B is methylmethacrylate.

* * * * *

UNITED STATES PATENT AND TRADEMARK OFFICE
CERTIFICATE OF CORRECTION

PATENT NO. : 5,338,805
DATED : August 16, 1994
INVENTOR(S) : Besecke et al

It is certified that error appears in the above-indentified patent and that said Letters Patent is hereby corrected as shown below:

Column 16, claim 1, line 14, "$C_5$" should read --$C_6$--.

Column 16, claim 1, line 39, both occurrences, "$C_5$" should read --$C_6$--.

Signed and Sealed this

Eighth Day of November, 1994

Attest:

BRUCE LEHMAN

Attesting Officer     Commissioner of Patents and Trademarks